United States Patent [19]
Hetherington et al.

[11] Patent Number: 5,930,819
[45] Date of Patent: Jul. 27, 1999

[54] METHOD FOR PERFORMING IN-LINE BANK CONFLICT DETECTION AND RESOLUTION IN A MULTI-PORTED NON-BLOCKING CACHE

[75] Inventors: Ricky C. Hetherington, Pleasanton; Sharad Mehrotra, Cupertino; Ramesh Panwar, Santa Clara, all of Calif.

[73] Assignee: Sun Microsystems, Inc., Palo Alto, Calif.

[21] Appl. No.: 08/881,238

[22] Filed: Jun. 25, 1997

[51] Int. Cl.⁶ ...................................................... G06F 12/00
[52] U.S. Cl. ........................... 711/131; 711/105; 711/141; 711/133; 711/127
[58] Field of Search ..................................... 711/131, 105, 711/141, 133, 127

[56] References Cited

U.S. PATENT DOCUMENTS

| | | | |
|---|---|---|---|
| 5,274,790 | 12/1993 | Suzuki | 711/133 |
| 5,623,628 | 4/1997 | Brayton et al. | 711/141 |
| 5,761,714 | 4/1996 | Liu et al. | 711/127 |
| 5,781,924 | 3/1997 | Zaitzeva et al. | 711/131 |
| 5,787,267 | 6/1995 | Leung et al. | 711/105 |

*Primary Examiner*—John W. Cabeca
*Assistant Examiner*—Nasser Moazzami
*Attorney, Agent, or Firm*—Stuart T. Langley; William J. Kubida; Holland & Hart LLP

[57] ABSTRACT

A data cache unit associated with a processor, the data cache unit including a multi-ported non-blocking cache receiving a data access request from a lower level device in the processor. A memory scheduling window includes at least one row of entries, wherein each entry includes an address field holding an address of the access request. A conflict map field within at least some of the entries is coupled to a conflict checking unit. The conflict checking unit responds to the address fields by setting bits in the conflict map fields to indicate intra-row conflicts between entries. A picker coupled to the memory scheduling window responds to the conflict map fields so as to identify groups of non-conflicting entries to launch in parallel at the multi-ported non-blocking cache.

14 Claims, 7 Drawing Sheets

METHOD FOR PERFORMING IN-LINE BANK CONFLICT DETECTION AND RESOLUTION IN A MULTI-PORTED NON-BLOCKING CACHE

CROSS-REFERENCES TO RELATED APPLICATIONS

The subject matter of the present application is related to that of U.S. patent application Ser. No. 08/881,958 identified as Docket No. P2345/37178.830071.000 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 identified as Docket No. P2346/37178.830072.000 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 identified as Docket No. P2348/37178.830073.000 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 identified as Docket No. P2349/37178.830074.000 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 identified as Docket No. P2350/37178.830075.000 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 identified as Docket No. P2351/37178.830076.000 for APPARATUS FOR DYNAMICALLY RECONFIGURING A PROCESSOR filed concurrently herewith by Ramesh Panwar and Ricky C. Hetherington; Ser. No. 08/881,732 identified as Docket No. P2353/37178.830077.000 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 identified as Docket No. P2355/37178.830078.000 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 identified as Docket No. P2365/37178.830080.000 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 identified as Docket No. P2369/37178.830081.000 for APPARATUS FOR TRACKING PIPELINE RESOURCES IN A SUPERSCALAR PROCESSOR filed concurrently herewith by Ramesh Panwar; Ser. No. 08/882,525 identified as Docket No. P2370/37178.830082.000 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 identified as Docket No. P2371/37178.830083.000 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 identified as Docket No. P2372/37178.830084.000 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 identified as Docket No. P2398/37178.830085.000 for NON-BLOCKING HIERARCHICAL CACHE THROTTLE filed concurrently herewith by Ricky C. Hetherington and Thomas M. Wicki; Ser. No. 08/881,727 identified as Docket No. P2406/37178.830086.000 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 identified as Docket No. P2408/37178.830087.000 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 identified as Docket No. P2434/37178.830088.000 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

The present invention relates in general to microprocessors and, more particularly, to a system, method, and microprocessor architecture providing in-line bank conflict detection and resolution in a multi-ported non-blocking cache.

2. Relevant Background

Modern processors, also called microprocessors, use techniques including pipelining, superpipelining, superscaling, speculative instruction execution, and out-of-order instruction execution to enable multiple instructions to be issued and executed each clock cycle. As used herein the term processor includes complete instruction set computers (CISC), reduced instruction set computers (RISC) and hybrids. The ability of processors to execute instructions has typically outpaced the ability of memory subsystems to supply instructions and data to the processors, however. Most processors use a cache memory system to speed memory access.

Cache memory comprises one or more levels of dedicated high-speed memory holding recently accessed data, designed to speed up subsequent access to the same data. Cache technology is based on a premise that programs frequently re-execute the same instructions. When data is read from main system memory, a copy is also saved in the cache memory, along with an index to the associated main memory. The cache then monitors subsequent requests for data to see if the information needed has already been stored in the cache. If the data had indeed been stored in the cache (i.e., a "hit"), the data is delivered immediately to the processor while the attempt to fetch the information from main memory is aborted (or not started). If, on the other hand, the data had not been previously stored in cache (i.e., a "miss") then it is fetched directly from main memory and also saved in cache for future access.

Typically, processors support multiple cache levels, most often two or three levels of cache. A level 1 cache (L1 cache) is usually an internal cache built onto the same monolithic integrated circuit (IC) as the processor itself. On-chip cache is the fastest (i.e., lowest latency) because it is accessed by the internal components of the processor. On the other hand, off-chip cache is an external cache of static random access memory (SRAM) chips plugged into a motherboard. Off-chip cache has much higher latency, although is typically much shorter latency than accesses to main memory.

Given the size disparity between main system memory (which may be tens or hundreds of megabytes) and cache memory (which is typically less than one megabyte), certain rules are used to determine how to copy data from main memory to cache as well as how to make room for new data when a cache is full. In direct mapped cache, the cache location for a given memory address is determined from the middle address bits. In other words, each main memory address maps to a unique location in the cache. Hence, a number of different memory addresses will map to the same cache location. In a fully associative cache, data from any main memory address can be stored in any cache location. Each cache line is indexed by a "tag store" that holds a "tag" generated, for example, by hashing the memory address that it indexes. All tags are be compared simultaneously (i.e., associatively) with a requested address, and if one tag matches, then its associated data is accessed. This requires an associative memory to hold the tags that makes this form of cache expensive.

Set associative cache is essentially a compromise between direct mapped cache and a fully associative cache. In a set associative cache, each memory address is mapped to a certain set of cache locations. An N-way set associative cache allows each address to map to N cache locations (for example, four-way set associative allows each address to map four two different cache locations). In other words, in a four-way set associative cache, each tag maps to four possible cache locations in a set. Upper address bits in the requested address will uniquely identify which item in the set the tag is referencing.

Superscalar processors achieve higher performance by executing many instructions simultaneously. These instructions generate multiple numbers of memory loads or stores per cycle. Conventional processors use several techniques to allow coherent and parallel access to the cache and memory hierarchy. One technique, used commonly at the lowest level of cache access, provides duplicate copies of the cache. This technique is most effective with read only cache so as to avoid a problem with maintaining consistency between both cache copies. Each cache copy doubles the real estate consumed as compared to a single cache copy. Increased size tends to limit clock speeds. Hence, this technique is limited to small caches and typically enables only two cache copies and so two accesses per cycle.

Another technique involves using high speed circuitry to allow two or more accesses per processor clock cycle. This approach assumes that the processor clock is sufficiently slow that the cache clock can be increased. In practice, however, the processor performance demands force the processor clock to be increased such that the ratio of processor clock to cache clock fails to allow significant advantage to this technique.

A similar technique is to provide multiple banks with each bank serving a particular main memory address. While this technique is adaptable to larger cache sizes, it too has limited scaleability. Multi-bank caches, like duplicate caches, tend to limit clock speeds. Multiple banks are successfully used to enable multiple accesses per clock cycle, but have performance limits caused by addresses conflicts. Address conflicts arise when two cache accesses are attempting to access the same bank. What is needed is an effective means to limit the opportunity for address conflicts. Further, a need exists for efficient address conflict detection as well as a method and apparatus for resolution of address conflicts once detected.

SUMMARY OF THE INVENTION

The present invention involves a multi-level cache and method for in-line bank conflict detection and resolution in a multi-ported non-blocking cache. A data cache unit including a multi-ported non-blocking cache receives data access requests from lower level devices in the processor. A memory scheduling window includes at least one row of entries, where each entry includes an address field holding an address of the access request. A conflict map field within at least some of the entries is coupled to a conflict checking unit. The conflict checking unit responds to the address fields by setting bits in the conflict map fields to indicate intra-row conflicts between entries. A picker coupled to the memory scheduling window responds to the conflict map fields so as to identify groups of non-conflicting entries to launch in parallel at the multi-ported non-blocking cache.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The present invention makes it possible to execute a number of related or unrelated cache accesses per cache cycle into a multi-ported cache. The particular examples show a cache with four address ports capable of executing up to four cache access per cycle. In view of the highly scaleable design of the present invention, it is contemplated that a larger or smaller number of address ports may be used while achieving the benefits of the present invention.

Desirably, the present invention is implemented using a level 2 cache that is a non-blocking, unified cache with four address and data ports and sixteen banks. Lower levels of the cache hierarchy (i.e., level 1 caches) can generate one instruction cache load. Other lower level functional units within the processor can generate two integer loads, four floating point loads, and numerous sources of requests that are accesses to the level 2 cache tag only. In accordance with the present invention, these lower levels of the hierarchy, including the lower-level functional units, do not need to have any knowledge of the potential for bank conflict and nor any information about when their data accesses can be coupled with a tag probe access. This feature greatly simplifies implementation of the present invention and is compatible with high speed processors.

Figure 1:
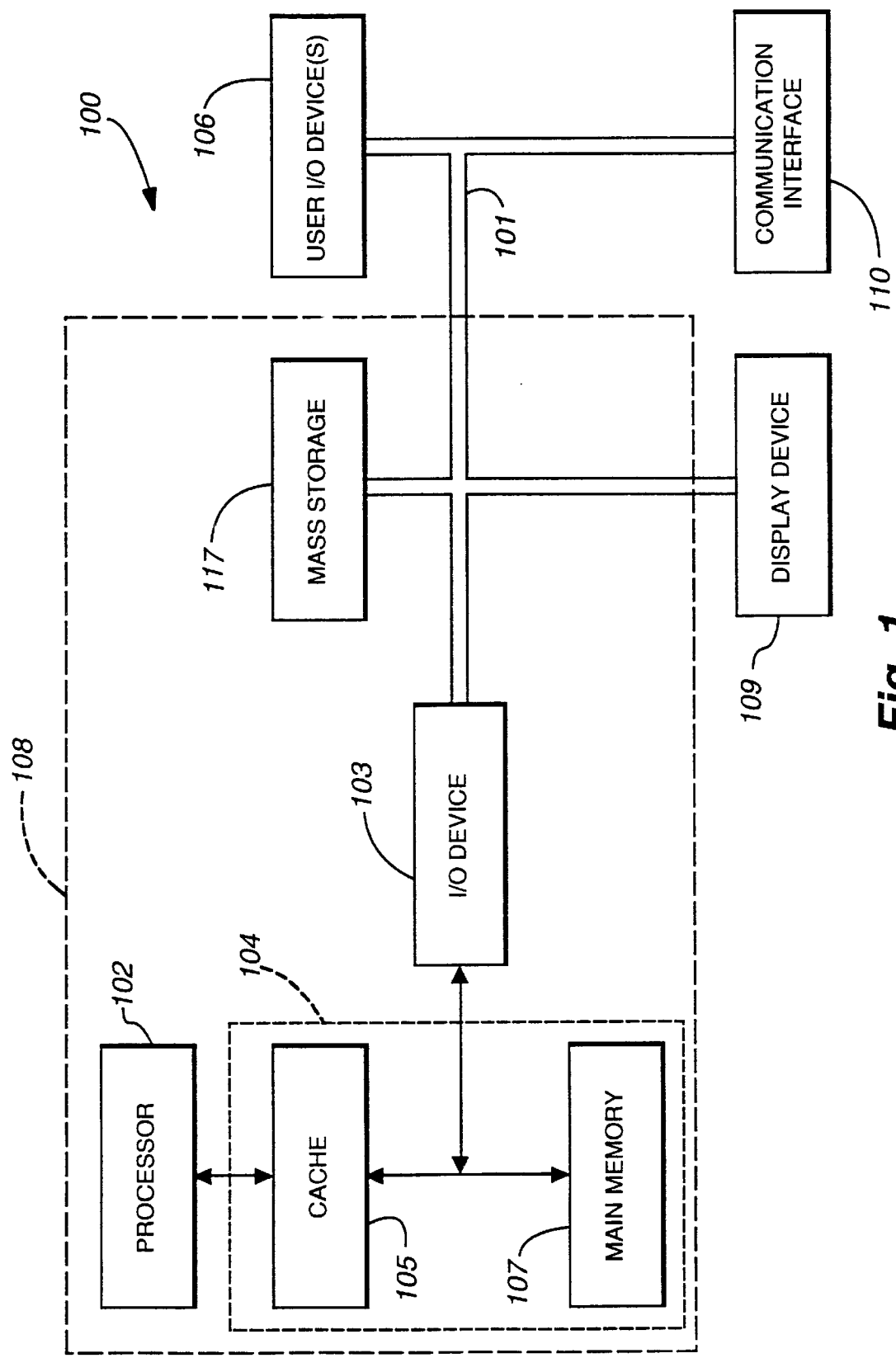
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices. The present invention primarily involves managing memory transactions, but necessarily impacts others of these basic processor functions.

Figure 2:
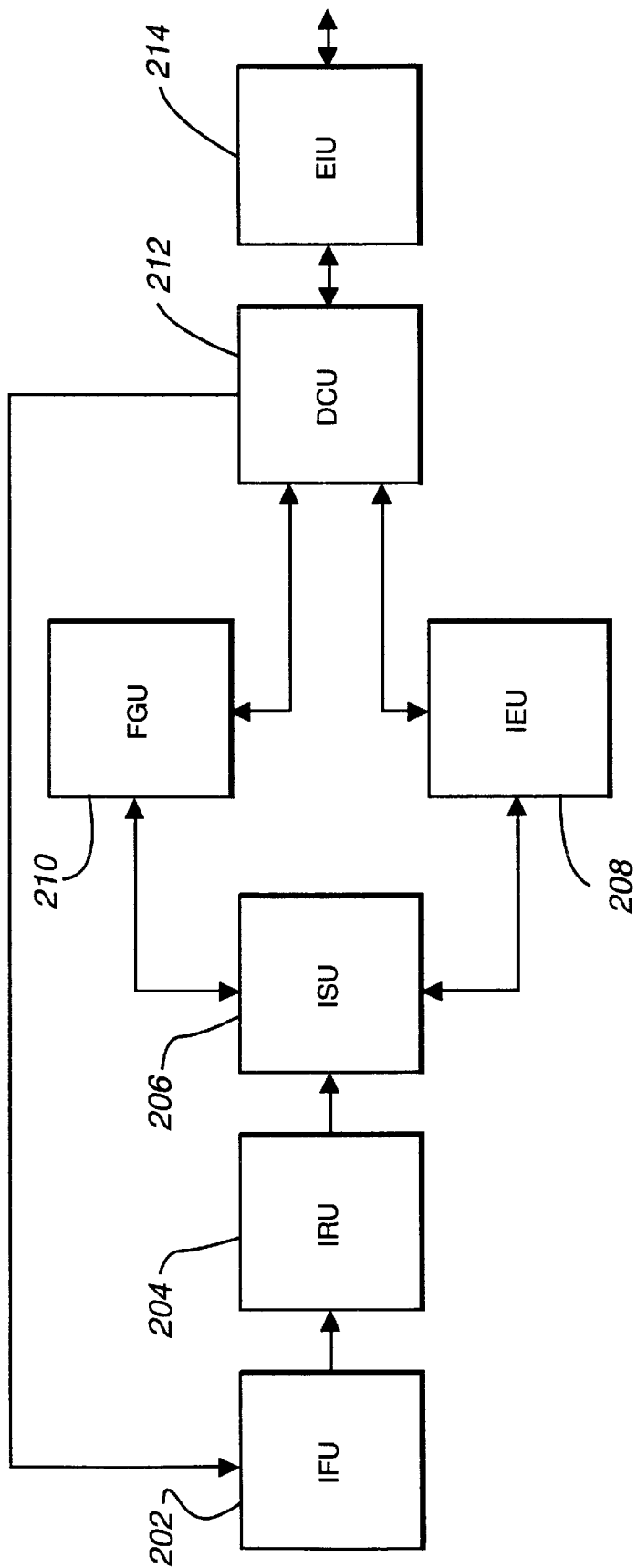
FIG. 2 shows a processor in block diagram form incorporating the apparatus and method in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 202 fetches an entire cache line from I$ in once cycle, which is 32 bytes in the particular examples herein. When instructions to be fetched are not valid or do not exist in I$ (i.e., a cache miss), the request is forwarded to higher cache levels in the cache hierarchy. In the particular example, I$ generates a cache access request to the level 2 cache (shown in FIG. 3) and that access is serviced by returning a full cache line including 32 bytes of data to I$. In accordance with a particular implementation of the present invention, IFU 202 speculatively continues operation after an I$ cache miss as if the access request hits in the level 2 cache.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched but has not yet completed or been retired. IRU 204 outputs renamed instructions to instruction scheduling unit (ISU) 206.

ISU 206 receives renamed instructions from IRU 204 and registers them for execution. Upon registration, instructions are deemed "live instructions" in a specific example. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

IEU 208 generates accesses to the level 1 data cache (D$) to obtain integer operands. In the particular example, each integer load accesses an entire line in D$ (i.e., 32 bytes in a particular example). Multiple D$ accesses per cycle are enabled by duplication of the D$, although other techniques could be used. When an access request misses in D$, it is forwarded to the level 2 cache. In accordance with the present invention, IEU 208 speculatively continues operation after a D$ cache miss as if the access request hits in the level 2 cache. When multiple integer loads are serviced by the level 2 cache each clock cycle, the present invention is useful in detecting and handling these bank conflicts between the loads.

In a particular implementation, window ID's are provided by instruction scheduling unit 206 (shown in FIG. 2) for every integer load that misses in the level 1 data cache. The window ID points to the instruction in ISU 206 that caused IEU 208 to generate the level 1 cache access (and so the level one cache miss). This window ID is used to replay the instruction so that the index of the load is available at the level one data caches when data is supplied by the level 2 cache.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

FGU 210 obtains floating point data directly from the level 2 cache in the particular implementation herein. For example, FGU 210 can generate up to four independent access requests to L2$ each clock cycle. In the particular example, the number of independent access requests per cycle is determined by the number of L2$ ports that can supply the independent data. All four accesses can be completed in one cycle in the level 2 cache if there are no bank conflicts. An important feature of the present invention is the detection and handling of these bank conflicts to enable up to the full four accesses per cycle.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises two hierarchical levels of cache memory on-chip and a third cache level accessible through EIU 214. DCU 212 also includes the associated logic to control the cache memory levels. One or more of the cache levels within DCU 212 may be read only memory to eliminate the logic associated with cache writes.

DCU 212 in accordance with the present invention is illustrated in greater detail in FIG. 3 through FIG. 7. DCU 212, alternatively referred to as the data cache subsystem, comprises separate instruction and data caches (labeled I$ and D$ in FIG. 3 and FIG. 4) at the primary level, a unified on-chip level 2 cache and an external level 3 cache. When processor 102 recognizes that data being read from memory is cacheable, processor 102 reads an entire 32-byte line into the appropriate cache (i.e., L1, L2, L3, or all three) . This operation is called a cache line fill. If the memory location containing that operand is still cached the next time processor 102 attempts the operand, processor 102 can read the operand from the cache instead of going back to memory.

As the data is returned from higher cache levels or main memory, it is stored in the allocated cache line for future use. One feature of the present invention is that as the data is returned, it is also passed downward to lower cache levels and/or a lower level device in processor 102 that generated the cache access. For example, IEU 208 or FGU 210 could generate a cache access while executing an instruction. Similarly, the level 1 caches (I$, D$) could generate a cache access to the level 2 cache. In accordance with the present invention, the returning data is written through the cache level rather than waiting for that cache level to fill the line and validate the data.

When processor 102 attempts to write data to a cacheable area of memory, it first checks if a cache line for that memory location exists in the cache. If a valid cache line does exist, processor 102 (depending on the write policy currently in force) can write the data into the cache instead of (or in addition to) writing it out to main memory 107. This operation is called a "write hit". If a write misses the cache (i.e., a valid cache line is not present for area of memory being written to), processor 102 performs a cache line fill by allocating a line for the requested data. Cache system 105 then writes the data from internal registers into the allocated cache line and (depending on the write policy currently in force) can also write the data to main memory 107. When the data is to be written out to the L3 cache it is first written to the write back cache unit L2$ WBC, and then written from the L2$ WBC unit to the L3 cache. When the data is to be written out to memory, it is written first into the write back cache unit E$ WBC, and then written from the E$ WBC unit to memory when the system bus is available.

The first level cache (L1$ in FIG. 3) has the lowest latency at approximately two clock cycles. The level 2 cache (labeled L2$) is next at 11 clock cycles which, again, is measured from the launch of the virtual address of the load instruction. The level 3 off-chip cache has an approximate latency of 25 cycles and finally latency to main memory is approximate number at 100.

Figure 3:
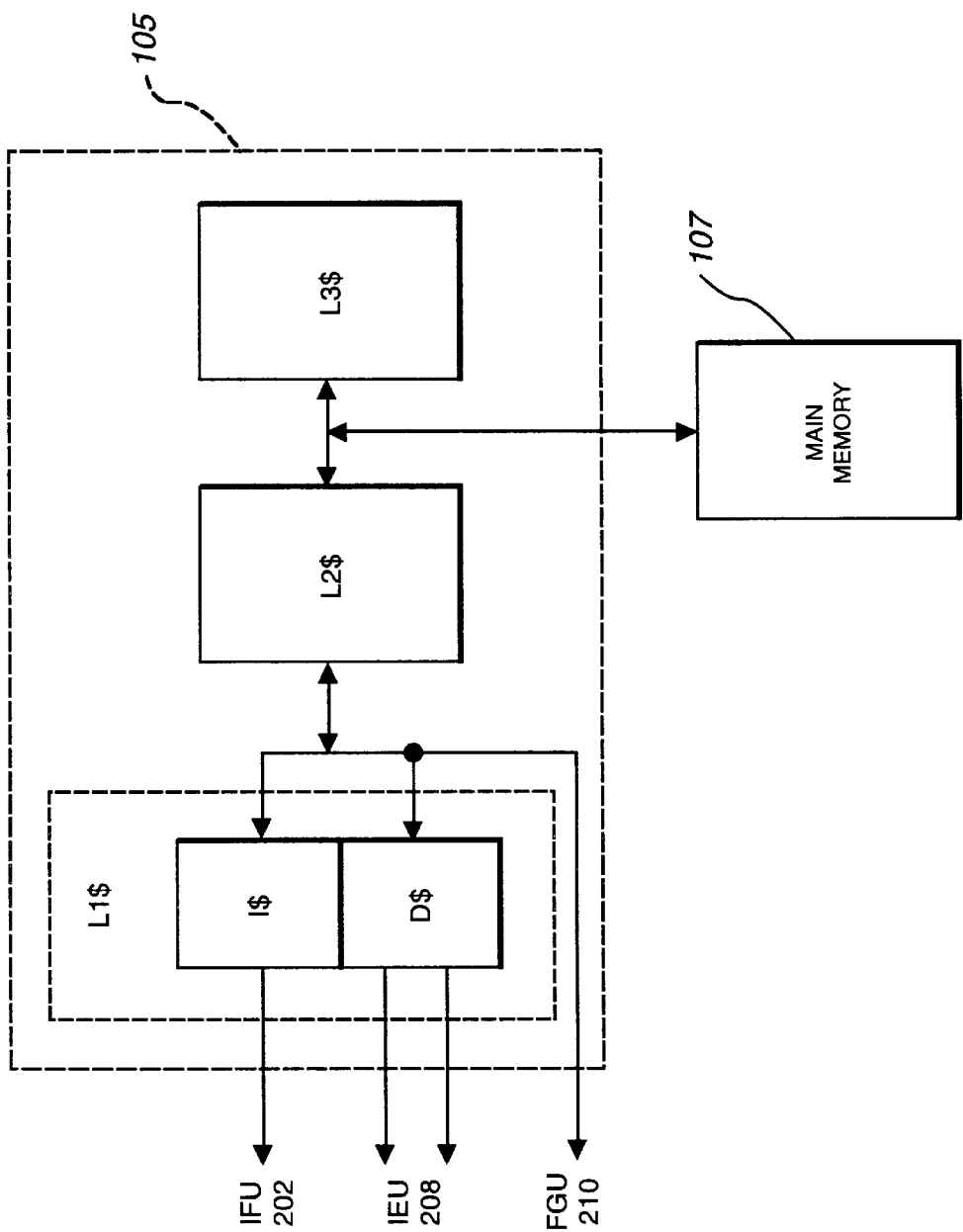
FIG. 3 illustrates in block diagram form a high level overview of a cache subsystem in accordance with the present invention.
Figure 4:
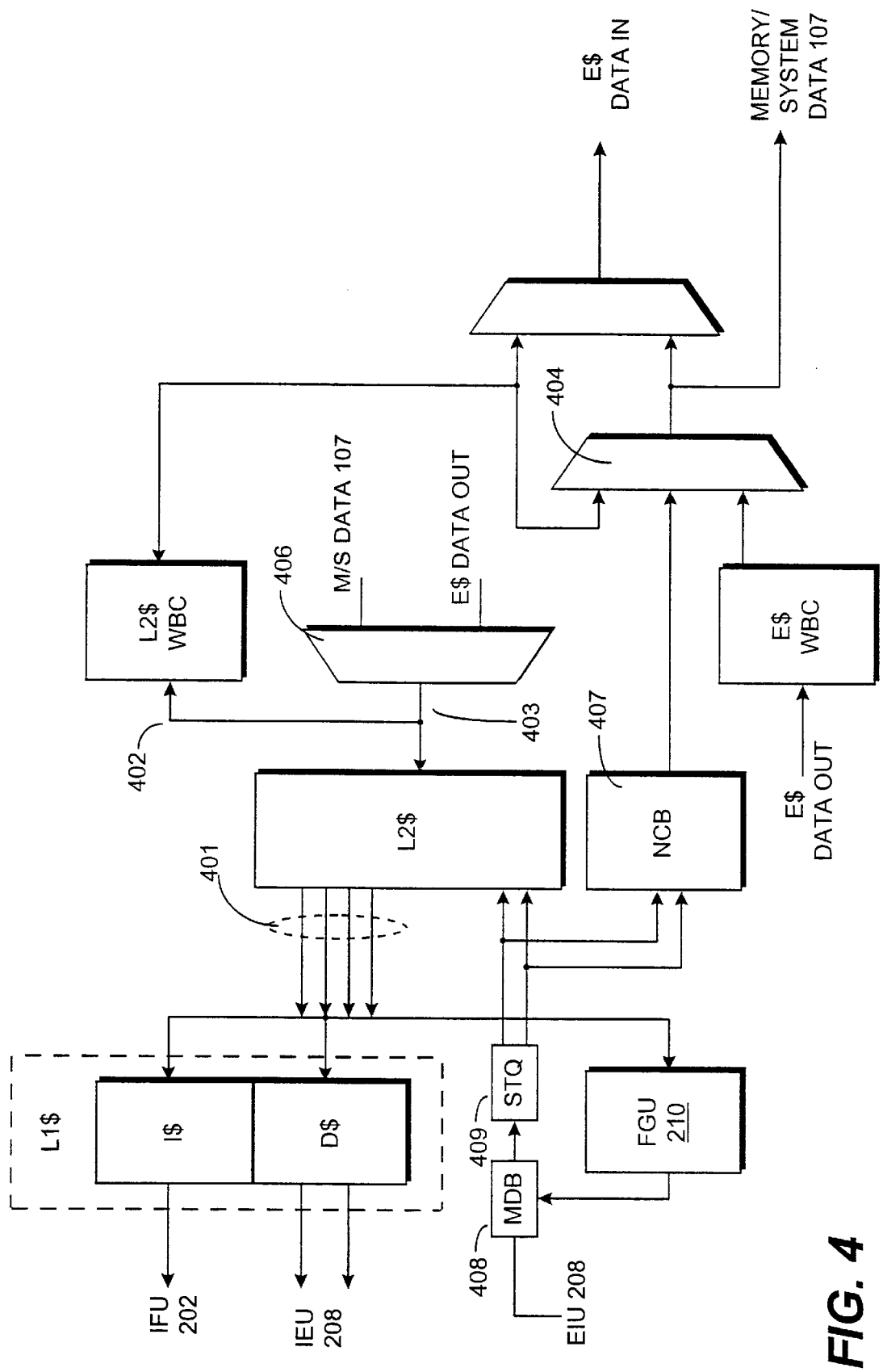
FIG. 4 shows data paths in the cache subsystem of FIG. 3 in block diagram form.

The instruction cache denoted as I$ in FIG. 3 and FIG. 4 is accessed by IFU 202 and provides one or more instructions per cycle to IFU 202. In a particular example, I$ is non-blocking and is virtually addressed by the instruction pointer generator as described in referenced to IFU 202. The level one data caches denoted as D$ services one or more loads or stores per cycle to IEU 208. In the particular implementation shown in FIG. 3, two operations per cycle are implemented by replicating D$ into two separate 64 KBytes caches that are kept identical. Other means of providing multiple accesses per cycle are known, and may be preferable in certain applications. However, duplicating D$ is straightforward, is compatible with high frequency operation, and an acceptable increase in hardware size because D$ is relatively small compared to higher cache levels. D$ is also implemented as a non-blocking cache is indexed virtually from two independent memory pipes. In the example of FIG. 3 and FIG. 4, both copies of D$ are read only data caches to improve performance. It should be understood that read-write data caches may be substituted and make use of the teachings in accordance with the present invention with predictable impact on performance and complexity.

The level 2 cache is a unified instruction and data cache in the example of FIG. 3 and FIG. 4. L2$ comprises four independent 8 byte read ports 401, a 16-byte write port 402, and a 32 byte fill and victim port 403 in a specific implementation. Preferably, L2$ is a fully pipelined, and non-blocking cache that comprises a mechanism (memory scheduling window 502 shown in FIG. 5) to track all outstanding memory references. Floating point data requests from FGU 210 are accessed directly from the L2 cache. Multiplexor 404 under control of cache unit 105 selectively couples either the output of E$, the output of the L2 write back cache , or output of non cacheable store buffer 407 to main memory 107. Multiplexor 406 under control of cache unit 105 selectively couples the E$ output or data from the memory bus to place on fill/victim port 403.

The level 3 cache is off-chip in the particular embodiment of FIG. 3 and FIG. 4. Most architectures must implement at least some cache off-chip. Latency of the off-chip cache may be 20–50 times that of on-chip cache. The L3 cache may be implemented using, for example, SRAM or dual data RAM (DDR). DDR is a synchronous component that provides a clock along with returned data that enables a data rate of 16 Gbyte/second or higher.

In a particular examples, processor 102 generates a 45 bit physical address (PA) capable of physically addressing 32 TeraByte of memory. Main memory 107 can be implemented in any available RAM component such as DRAM, EDODRAM, SDRAM, or SDRAM2 which like the DDR SRAM discussed above provides a clock along with data allowing it to provide high bandwidth performance.

A data path from the level 2 cache to I$ is 256 bits (32 Bytes) wide in a particular example. The specific byte widths of access ports and data paths are provided to illustrate relative scale between components and are not a limitation on the teachings of the present invention. It is well known it adjust the data path widths to achieve particular operational performance. Both copies of the level 1 data caches D$ are filled from the level 2 cache with identical data from the same 32 Byte port. Because they are read only, independently reading the caches does not raise any coherency issues. If the multiple D$ caches were write enabled, additional measures would be required to ensure cache coherency between the D$ copies.

A memory disambiguation buffer (MDB) 408 feeds a store queue (STQ) 409. ISU 206, shown in FIG. 2) generates loads following unretired stores that may potentially access the same address. Detection of a "read after write" (RAW) hazard occurs in MDB 408 and this event generates a bypass of the store data to the pipes. MDB 408 also feeds STQ 409 where store coalescing will occur and the eventual write to the level 2 cache. Store coalescing reduces memory traffic by combining two or more memory operations into a single operation where the operations affect the same blocks of data and that data is stored in STQ 409.

The external level 3 cache, labeled E$ in the figures, is accessed via an on-chip tag store in accordance with the present invention. In a particular example, E$ is 4-way set associative with a 256 bit data bus. The data bus connection to main memory 107 (and the system) is 128 bits wide.

Figure 5:
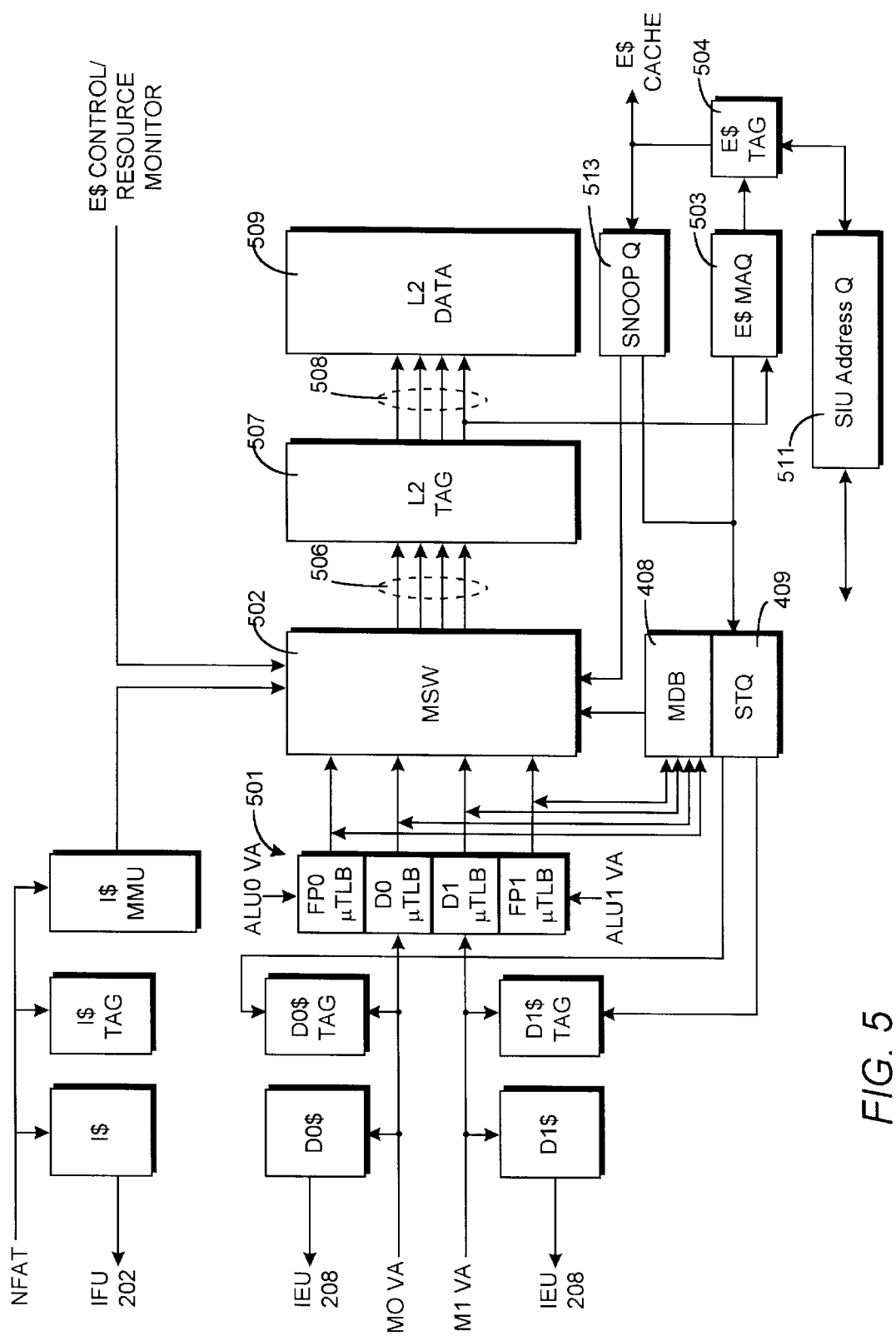
FIG. 5 illustrates address paths in the cache subsystem of FIG. 3 in block diagram form.

FIG. 5 illustrates address paths for cache/memory subsystem 105. The first level caches (I$ and all copies of D$) are virtually indexed and physically tagged. These caches have each line indexed by virtual address, however the tag bits are from the physical address determined after the virtual address is translated. In a particular implementation, I$ is 64 KByte four-way set associative cache that is addressed by a next fetch address table (NFAT) within IFU 202. Desirably, I$ is fully wave pipelined delivering 8 instructions per cycle. A miss in I$ is satisfied from either the Level 2 cache or an instruction prefetch streaming buffer (not shown). Other implementations of I$ are possible including direct mapped, 2-way set associative, and fully associative and may be desirable in some applications. Accordingly, these other implementations are equivalent to the specific embodiments described herein for purposes of the present invention.

In a particular example, IEU 208 includes two memory pipes M0 and M1 generating effective virtual addresses (indicated by M0 VA and M1 VA in FIG. 5) for integer and floating point load and store operations. IEU 208 also includes two arithmetic logic units (ALU0 and ALU1) generating virtual addresses (indicated by ALU0 VA and ALU1 VA) dedicated for floating point loads and stores. Virtual to physical address translation occurs in a conventional manner through micro translation lookaside buffers ($\mu$TLBs) 501 that are hardware controlled subsets of a main translation lookaside buffer (TLB) (not shown) TLBs store the most-recently used virtual:physical address pairs to speed up memory access by reducing the time required to translate virtual addresses to physical addresses needed to address memory and cache.

In the implementation shown in FIG. 5, four integer/floating point loads are generated per cycle into the level 2 cache. The entry point into the level 2 cache is via the memory scheduling window (MSW) 502 that tracks all memory operations not satisfied by the level 1 caches. MSW

501 functions to track all outstanding memory requests, retain addresses for fills and snooping and perform bank conflict resolution so that all four ports are afforded access the each of the banks of the level 2 cache. In a specific example, the L2 cache comprises 16 banks of 32 Kbyte memory. All four µTLBs generate addresses to MDB 408 and STQ 409 described hereinbefore. MDB 408 performs dynamic memory address disambiguation that enables the out-of order execution of memory operations (e.g., LOAD and STORE operations).

Access to the level 2 cache is controlled by a memory scheduling window (MSW) 502 shown in FIG. 5 which is a tracking mechanism for all accesses that caused a miss in the L1 I and D caches, FGU 210, the prefetching hardware in IFU 202, or the operating system during snoops. MSW 502 includes four address ports 506 each of which can couple a new address to L2 TAG 507 every clock cycle. L2 TAG 507 operates in a conventional manner to index each line in L2 data portion 509 via lines 508. In the example. of FIG. 5, L2 TAG 507 and L2 data portion 509 are organized as a four-way set associative cache.

The present invention could alternatively be implemented in a direct mapped cache in which each main memory address maps to a unique location in the cache. In fully associative cache, data from any main memory address can be stored in any cache location. All tags must be compared simultaneously (i.e., associatively) with the requested address, and if one matches, then its associated data is accessed. Set associative cache is a compromise between direct mapped cache and a fully associative cache where each address is mapped to a set of cache locations. The four-way set associative cache of the specific example allows each address to map to four different cache locations.

E$ memory address queue (MAQ) 503 maintains a record of level 2 misses that are directed to the external level 3 cache and to main memory 107. It may be desirable to maintain the E$ TAG unit 504 on-chip even where the external cache is off-chip for high bandwidth and low latency. On-chip E$ TAG 504 also supports an off-chip associative cache. On-chip E$ TAG unit 504 enables processor 102 to filter system coherence snoops from EIU 214 to minimize the impact of snoops on processor 102 except when a match to the E$ TAG is detected.

The operating may support an ability to "snoop" accesses to system memory and to their internal caches via snoop queue 513. This snooping ability is used to keep internal caches consistent both with system memory and with the caches in processor 102. The snoop capability is also relied on to provide cache coherency in multiprocessor applications.

Figure 6:
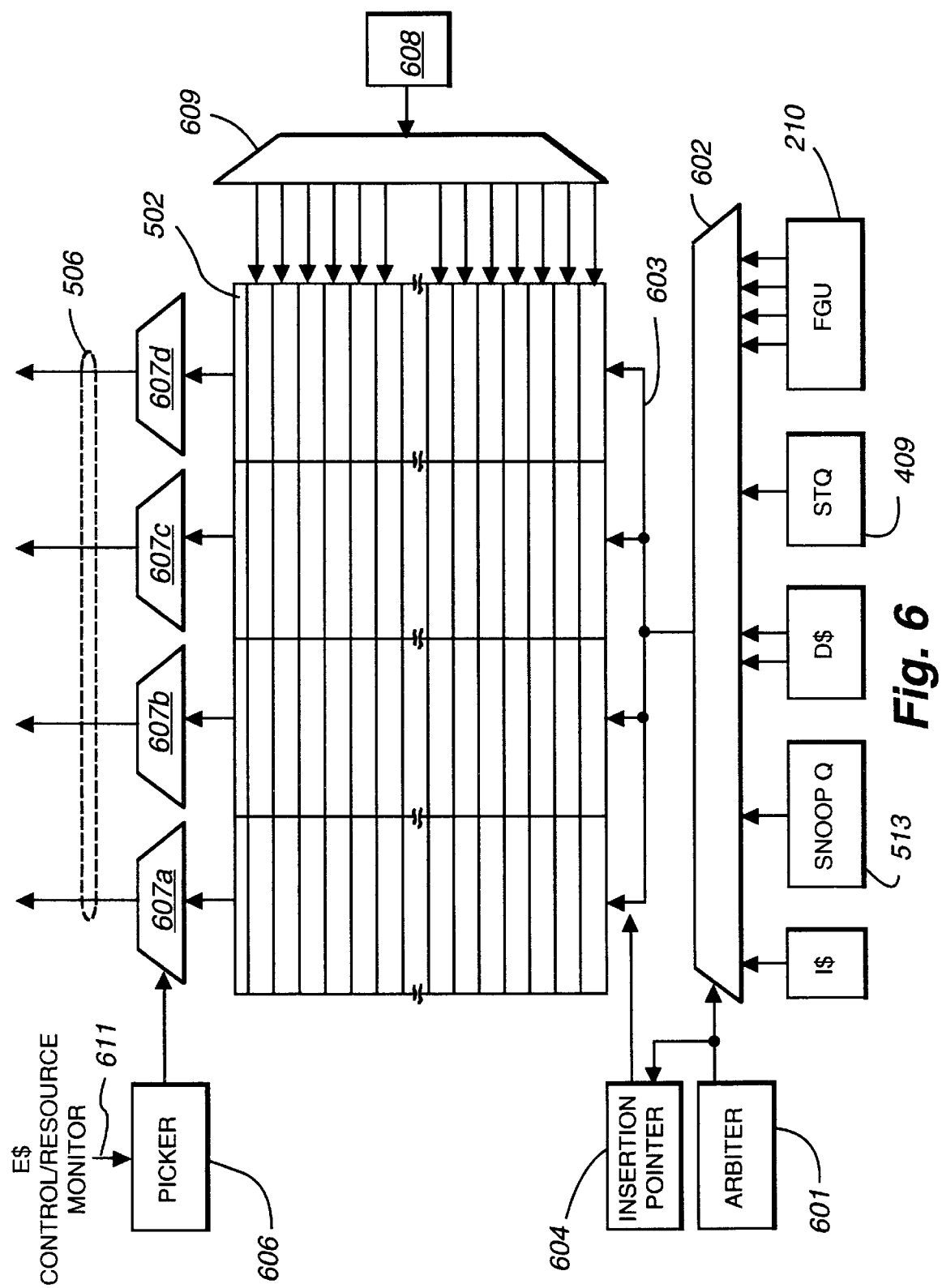
FIG. 6 illustrates operation of a memory scheduling window in accordance with the present invention.

FIG. 6 illustrates in block diagram form major features and connections useful in the operation of memory scheduling window 502. As described hereinbefore, all cache structures are desirably implemented as non-blocking cache. In the event of a miss to any cache, that cache is available for subsequent references. MSW 502 serves as a centralized memory reference management structure and as an entry point into the level 2 cache. MSW 502 may be equivalently implemented between, for example, main memory 107 and the level 3 cache (E$) in addition to the implementation shown in FIG. 6. MSW 502 records, tracks and acts upon all references into the level 2 cache. MSW 502 is not informed of references that are satisfied at the level 1 caches in the exemplary implementations of the present invention, although it is contemplated that such information may be useful in some applications. All other cache/memory accesses will arbitrate and then create an entry into MSW 502.

The level 2 cache receives "bottom-up" access from the level one caches and FGU 210. These are referred to as bottom-up because the access request originates from a lower cache level or a functional unit within the processor itself. Other bottom-up accesses are originated from I$, D$, STQ 409, and snoop queue 513. The level 2 cache also receives "top-down" accesses such as data from an L2 miss being pushed down from E$ or main memory 107. One feature of the present invention is that top-down accesses are always given priority over bottom-up accesses, eliminating the need for arbitration between top-down and bottom-up accesses.

Arbiter 601 referees among the requesting bottom-up agents for access to the L2 cache by controlling one or more multiplexors 602. Priorities are a matter of design choice to meet the needs of a particular application. In a specific example, arbiter 601 is given a strong bias to accesses from the L1 data and instruction caches (D$, I$) and a weak bias to the snoop queue 513, however it is contemplated that other priorities and biases will be useful in particular applications. MUX 602 selects the bottom up access as directed by arbiter 601 and couples the selected access to one of insertion ports 603.

MSW 502 is organized as a number of columns of entries. Each column is alternatively referred to herein as a "port" and the ports are numbered as port 0, beneath MUX 607a, port 1, beneath MUX 607b, port 2, beneath MUX 607c and port 3, beneath MUX 607d. In the example of FIG. 5, MSW 502 includes the same number of columns (four) as the number of address ports 506 in the level 2 cache. In a particular example, each column includes 32 entries. Each column can be though of as a queue serving one of ports 506 to buffer memory access requests. Four entries in any given row are indexed at the same time by the row number (i.e. 0 to 31) allowing MSW 502 to launch up to four access requests to the level 2 cache simultaneously through ports 506. Desirably, the columns in MSW 502 wrap around such that row 0 is logically adjacent to row 31. Each column of entries in MSW 502 is coupled to receive bottom up accesses through one insertion port 603. Insertion port 603 is under control of insertion pointer 604. Any column may be coupled to any port 506 through multiplexors 607a, 607b, 607c, and 607d in response to select signals generated by picker 607.

Figure 7:
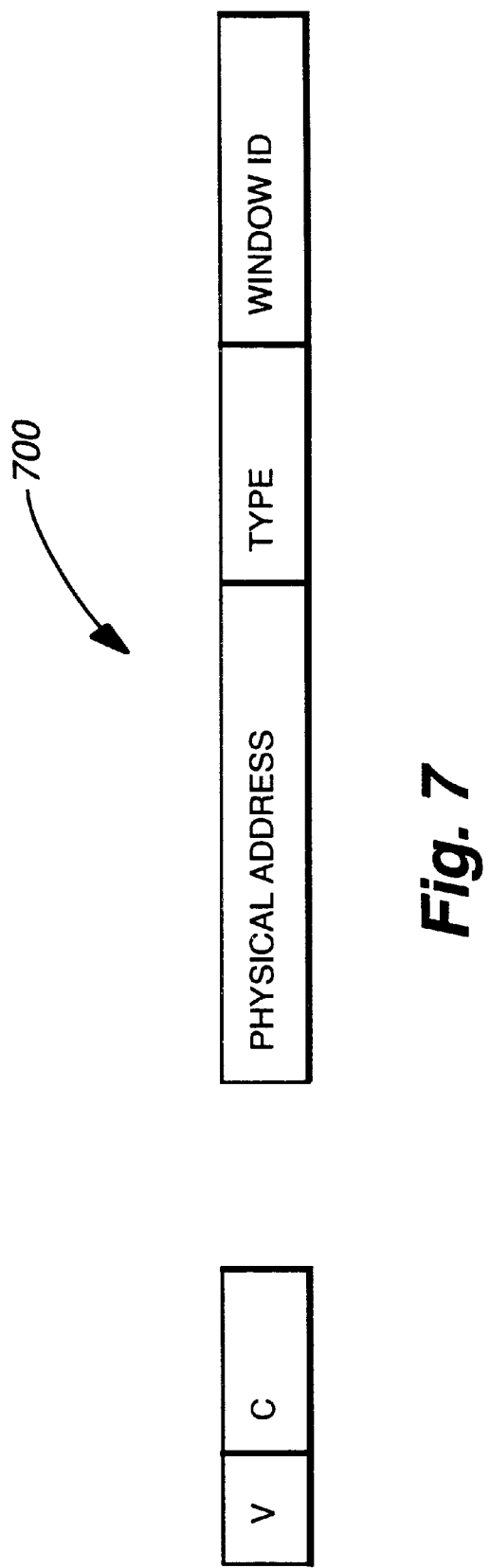
FIG. 7 illustrates an exemplary entry in the memory scheduling window shown in FIG. 6.

Each entry 700, shown in detail in FIG. 7, is associated with a valid bit (V) indicating whether the current entry is valid. When a level 2 cache operation is completed it is marked invalid indicating that the corresponding line in the level 2 cache can service bottom up access requests. Entries become invalid when the level 2 cache access is considered complete. A valid entry ping queue manager 608 is operative to set the valid bit directly in each entry through multiplexor 609. Valid entry ping manager 608 is desirably used because an access request can be terminated at anytime after insert or removal.

Each entry 700 includes one or more transit hazard bits (T) indicating whether an entry points to a cache line that has four previous outstanding cache misses against it. When a miss is detected in the level 2 cache, the replacement algorithm (e.g., a least recently used (LRU) algorithm) selects a replacement set and asserts a transit bit for that set. When a subsequent miss is taken, the replacement algorithm against selects the replacement set and asserts a second transit bit. Using a four-way set associative level 2 cache, only four outstanding transit misses are allowed for a given set before a stall should be generated. More (or fewer) outstanding accesses may be available depending on the cache organization, however, the present invention is readily adapted to handle other cache organizations. In accordance with the present invention, this transit hazard initiated "stall" does not stall insertion of access requests into MSW 502. Only picker 606 is stalled to prevent removal of fresh access to the level 2 cache until the transit hazard has subsided. Once picker 606 is stalled, the transit hazard will naturally subside at the outstanding level 2 cache misses are serviced.

One or more conflict (C) bits used for conflict checking are associated with each entry. A conflict exists when two entries include addresses that map to the same bank. These entries conflict and should not be launched at the same time. Similarly, each entry includes a type identifier that indicates the type of access represented (e.g., read, write, floating point, instruction, data). Differing data types may return differing amounts of data on each access, and so not all types allow four accesses to be launch simultaneously. For example, accesses generated to fill I$ and D$ are serviced by 32 byte data loads whereas accesses generated by FGU 210 generated 8 byte data loads in the particular examples given herein. The type identifier allows MSW 502 to prevent launching an I$ and D$ simultaneously (or with a floating point load) as the I$ and D$ will occupy the entire data port in the particular example. It is contemplated that other type identifiers may be used. Moreover, in some applications, for example where all data types generate loads of similar width, type identifiers would not be needed.

A number of physical address (PA) bits identifying a physical memory address that is the target of a particular memory operation. It is the PA that is actually applied to the level 2 cache on address ports 506 to access a specific location in the level 2 cache. If the level 2 cache were virtually addressed, the PA fields would be equivalently substituted by virtual address bits.

Each entry may include a window ID held in MSW 502. Window ID's are provided by ISU 206 (shown in FIG. 2) as described hereinbefore. The window ID as selected by picker 506 alerts or signals ISU 206 that the load pointed to by the window ID filed should be replayed. Since up to two integer loads can be received each clock cycle, picker 606 can send up to two window ids pack to ISU 206.

Insert pointer 604 selects the next available entry in each pane. An entry is considered available when it is empty or when it is a invalid but fully resolved entry. Insert pointer 604 indexes to a next entry beyond where is currently points and examines the V and C bits to decide if it can insert. If yes, then it increments it's pointer and moves forward. Nothing stalls insertion except for the queue wrapping to an entry that is not completed (valid). To simplify operation of insertion pointer 604, it will not jump over any invalid entries in search of valid ones. However, more efficient use may be made of MSW 502 if such jumping is enabled, at the cost of increased complexity.

In a particular example, port 0 is biased such that the access request in the Port 0 entry always gains access first. Entries in underpopulated rows (i.e., rows having fewer than all four entries filled) are forced to the lower number ports during insertion into MSW 502. Entries in ports 1, 2 and 3 have a conflict map of 4 bits (i.e., the bits labeled C in entry 700 shown in FIG. 7), indicating their intra-row dependency. Port 0, as set out above, is guaranteed access priority and so port 0 entries do not need any conflict bits.

One clock cycle after insertion, a cam (content addressable memory) unit 612 compares all addresses in the PA fields of the four entries in the most recently inserted row against each other to detect a potential bank conflict. The bit position in each map is set when its entry conflicts with that port (i.e., a conflict with the port 0 entry sets bit 0, a conflict with the port 1 entry sets bit 1, and the like). Picker 606 is responsive to the conflict bits during launch of the access requests from MSW 502 to the level 2 cache through ports 506.

In some instances, entries that access the same bank are not in fact conflicts (i.e., they can be successfully launched in a single clock cycle). For example, two entries generated by the level one data cache (D$) that access the same cache line in the level 2 cache are not in conflict. However, if the two entries access different cache lines, they are in conflict even where they do not map to the same bank, because they each access a full cache line and cannot be ported out of the level 2 cache at the same time. In the case of a conflict between accesses generated by D$, picker 606 is controlled by the conflict checking unit to launch each D$ entry separately. Hence, a row comprising two conflicted D$ accesses will require two clock cycles to launch. The type id fields shown in FIG. 7 within each entry are examined to determine if the potential conflicts are actual conflicts.

Picker 606 selects valid entries from MSW 502 for access to the L2 cache. Picker 606 includes a row pointer or index that in normal operation "chases" insert pointer 604. When a conflict is detected, the present invention directs picker 606 in order to handle the conflicts by stalling the row pointer for one or more clock cycles. For example, when a row comprises multiple accesses generated by FGU 210 (i.e., floating point loads) and a bank conflict is detected, picker 606 is directed to launch one non-conflicting group of loads each clock cycle until all the loads in that row have been launched. The row pointer in picker 606 does not change value or point to a new row until all entries in the current row are launched. Picker 606 is able to launch into each port independently by appropriate selection of inputs to multiplexors 607a–607d. As the ports are scheduled the conflict bits are disabled until all four, if there are four, accesses have been launched. Any number and combination of multiplexors 607a through 607d can be activated during one clock cycle to launch one, two, three, or four non-conflicting access requests per clock cycle.

Once an entry is created and inserted in MSW 502, there are optionally performed a number of other camming checks. Examples of such camming checks include a transit check that is a detection of whether there is any older access in flight to the same cache set and a secondary reference check that checks to see if the exact same cache block is currently being fetched from the L3 cache or main memory 107 by an earlier access. These camming checks can be implemented using known content addressable memory (CAM) techniques, circuits, and hardware and would desirably be performed in a single clock cycle. When the camming checks are complete the valid bit (V) is asserted and picker 606 can pick that entry for L2 access.

The results of these accesses from MSW 502 are not known to picker 606. Unlike conventional cache organizations that maintain a count of accesses that have missed and generated accesses to higher cache levels or main memory, picker 606 in accordance with the present invention does not include any self-throttling mechanisms that act in response to a level 2 cache miss. Hence, in normal operation picker 606 operates as if every access results in a hit in the level 2 cache.

In fact, some access will hit in the level 2 cache and some will miss which are then sent on to the level 3 cache. These misses can also cause writebacks from the level 2 cache to the level 3 cache (which is also not known to picker 606). In accordance with the present invention, as references to the L3 are resolved, E$ includes a control/resource monitor unit that enables the L3 cache (E$) to take control of picker 606 via control line 611 and point picker 606 at a particular entry or set of entries associated with a miss. Preferably, this control is complete and unarbitrable.

When the level 3 operation is complete it releases control of picker 606 and allows the picker to resume normal operation. By allowing the level 3 cache to take absolute control of the picker in a manner that disables its ability to generate and further requests, the level 3 cache can also monitor and control its own resources. The level 3 cache is aware of its own resource limitations such as the number of outstanding references to E$, remaining capacity in E$ MAQ 503, remaining capacity in snoop Q513, and the like. When one or more resources are expended or used to a predetermined "high water mark", the level 3 cache uses that awareness in accordance with the present invention to prevent further access until the sufficient resources become available. The level 3 cache prevents further access by causing picker 606 to stall.

In accordance with the present invention, when an access request misses in the level 2 cache the MSW identification (i.e. row number in MSW 502) of the request that missed is appended to the request as it is forwarded to the level 3 cache. As outstanding references in E$ complete, E$ uses the appended index to point picker 606 to selected entries 700 in MSW 502 that either perform the fill or writeback, eventually clearing the stall condition in the level 3 cache. Once cleared, the level 3 controller releases picker 606 and normal operation of picker 606 can resume.

All requests selected by picker 606 for access to the L2 cache are tagged for tracking throughout the cache and memory hierarchy with an MSW ID. The MSW ID is a reference that causes picker 606 to point to a particular entry. When a miss occurs on any level 2 access, the MSW ID is appended to the request at the level 3 cache. When data is returned for this request, the corresponding MSW ID for the entry being filled is forced on to picker 606 by the E$ control/resource monitor and overrides the current pointer position of picker 606. In turn, MSW 502 provides the appropriate index to the L2 cache for storing the data returned from E$ or main memory 107. This mechanism is also used for victim processing.

One feature of the conflict detection method and apparatus in accordance with the present invention is that conflict detection is based not only upon the physical address to determine bank conflicts in the memory, but also based upon data type of the access. By consideration of type information, apparent or conditional conflicts can be identified an the corresponding accesses allowed to perform in parallel because no actual conflict exists. Also, the type information provides MSW 502 with information about the resources required to services the access once it is launched. As discussed above, floating point loads access eight bytes per load while integer loads access thirty-two bytes per load in the particular example. The actual load size for any memory operation is a matter of choice, and the specific numbers are provided for reference only. With knowledge of the data type for each access loads are scheduled to make maximum use of available bandwidth and resources without exceeding the resource limitations in any clock cycle.

Other types of access, such as system snoops and store operations, require inquiries of the cache tag only and so place little or no demand on the data resources as the cache line itself is never accessed and data is not returned. In these cases, the present invention can make use of the data type information to launch snoop-type and store-type accesses in parallel with, for example, an I$ load that would otherwise have to be launched alone because of its heavy demand on data return resources. In other words, the conflict check mechanism in accordance with the present invention is aware of and acts on knowledge that an I$ initiated access conflicts with other I$-type, D$-type, and floating point-type accesses, but does not conflict with a snoop-type or store-type access. This feature in accordance with the present invention enables efficient hardware usage.

Another feature of the conflict detection method and apparatus in accordance with the present invention is that multiple loads can be launched in parallel even after a conflict is detected. Picker 606 handles conflicts by launching from port 0 and clearing conflict bit in position 0 in the remaining entries in that row. On the next clock cycle, up to three accesses can be launched simultaneously if the remaining conflict bits (i.e., the conflict bits in positions 1, 2, and 3 in the remaining entries in the row) are not set. In this manner, the detection of a conflict does not stop future parallel cache accesses where non-conflicting groups of access can be found.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. Accordingly, these and other variations are equivalent to the specific implementations and embodiments described herein.

We claim:

1. In a processor that executes coded instructions, a method for operation of a multi-ported cache memory unit comprising the steps of:

generating a plurality cache access request from a plurality of lower level devices, each access request comprising an address identifying a memory location having data that is a target of the access;

defining a set of the access requests;

analyzing the address within each access request in the set to detect access requests within the set that conflictingly reference banks of the multi-ported cache memory;

defining a subset of the set of access requests such that the access requests in the subset do not conflict; and launching the access requests within the subset by applying the addresses in each entry in the subset in parallel to the cache memory.

2. The method of claim 1 further comprising the steps of:

performing the subset defining and launching steps until every access request in the set has been launched.

3. The method of claim 1 wherein the step of defining a subset comprises:

first selecting one access request in the set; and secondly selecting all other access requests in the set that do not conflict with the first selected access request, wherein the first and second selected access requests define the subset.

4. The method of claim 1 further comprising the steps of analyzing a data type associated with access requests that conflictingly reference banks of a cache memory; and defining the subset to include access requests that conflictingly reference banks of a cache memory and are associated with data types that tolerate conflicting bank references.

5. The method of claim 1 further comprising:

providing data type information associated with each access request; and using the data type information in the subset defining step.

6. The method of claim 1 wherein the step of defining a set of the access requests further comprises:

providing a memory comprising a plurality of lines;

picking selected ones of the cache access requests after they are generated by the plurality of lower level devices;

inserting the picked access requests into an available line of the memory, wherein the inserting is performed in a non-blocking manner.

7. The method of claim 6 wherein the inserting is substantially free running and continues regardless of whether the launched access requests hit in the cache memory.

8. The method of claim 1 wherein the step of defining a set of the access requests further comprises:

providing a memory comprising a plurality of lines;

defining a number of fields within each line, each field sized to store a memory access request;

inserting the access requests into available fields of the memory, wherein the set comprises access requests within all fields of any given line.

9. The method of claim 8 wherein the number of fields in each line corresponds to a number of ports in the multi-ported cache memory.

10. The method of claim 8 further comprising the steps of:

in response to a launched access request, generating a hit signal when data corresponding to the access request exists in the cache memory; and in response to the hit signal, removing the access request from the memory making it available for future access requests.

11. The method of claim 8 further comprising the steps of:

in response to a launched access request, generating a miss signal when data corresponding to the access request fails to exist in the cache memory; and maintaining the access request within the memory until the data corresponding to the access request becomes available in the cache memory.

12. A method for operation of a multi-ported memory unit comprising the steps of:

generating a plurality access requests, each access request comprising an address identifying a memory location having data that is a target of the access;

analyzing the address of each access request to detect access requests that conflictingly reference ports of the multi-ported memory;

defining non-conflicting sets of the access requests such that the entries in each non-conflicting set do not conflict; and concurrently launching the entries within the defined set by applying the addresses within each entry in the set concurrently to the memory unit.

13. The method of claim 12 wherein the step of defining non-conflicting sets is performed even where the analyzing step detects conflicting access requests.

14. The method of claim 12 further comprising the steps of:

providing data type information associated with each access request; and analyzing the data type information associated with access requests that conflictingly reference banks of a cache memory; and defining the non-conflicting sets to include access requests that conflictingly reference ports of a cache memory and are associated with data types that tolerate conflicting port references.

* * * * *